United States Patent [19]

Bauer et al.

[11] Patent Number: 5,069,631
[45] Date of Patent: Dec. 3, 1991

[54] ELECTRICAL BREAKAWAY CONDUCTOR

[75] Inventors: David M. Bauer, Iffezheim, Fed. Rep. of Germany; David L. Gilbert, Paulding, Ohio

[73] Assignee: Aeroquip Corporation, Jackson, Mich.

[21] Appl. No.: 501,915

[22] Filed: Mar. 30, 1990

[51] Int. Cl.⁵ .............................................. H01R 13/62
[52] U.S. Cl. .................................... 439/159; 439/152; 439/258
[58] Field of Search ............... 439/152, 159, 160, 180, 439/451, 476, 484, 258

[56] References Cited

U.S. PATENT DOCUMENTS

| | | | |
|---|---|---|---|
| 2,158,385 | 5/1939 | Schwein | 439/152 |
| 3,830,525 | 8/1974 | Ransford, III | 439/180 |
| 3,830,954 | 8/1974 | Caudill | 174/35 MS |
| 4,571,012 | 2/1986 | Bassler et al. | 339/14 R |
| 4,821,392 | 4/1989 | Layland, Jr. | 439/160 |

FOREIGN PATENT DOCUMENTS

| | | |
|---|---|---|
| 0073112 | 3/1983 | European Pat. Off. . |
| 0174814 | 6/1986 | European Pat. Off. . |
| 8419252 | 6/1984 | Fed. Rep. of Germany . |
| 1163325 | 9/1958 | France ................................. 439/180 |

Primary Examiner—David L. Pirlot
Attorney, Agent, or Firm—Ralph J. Skinkiss; Duncan F. Beaman

[57] ABSTRACT

An actuator for use with electric conductor systems using push-to-connect fittings, especially suitable for tractor/semi-trailer connections employing an actuator body having linearly displaceable plungers mounted upon a flexible conductor fitting which separates the conductor fitting and receptacle upon the plungers extending. A lever operator mounted upon the actuator body is connected to a flexible lanyard of a length less than that of the electrical conductor whereby tensioning of the lanyard occurs before damaging tension can be applied to the conductor and lanyard tensioning extends the plungers to disconnect the conductor fitting and receptacle.

8 Claims, 1 Drawing Sheet

U.S. Patent     Dec. 3, 1991     5,069,631
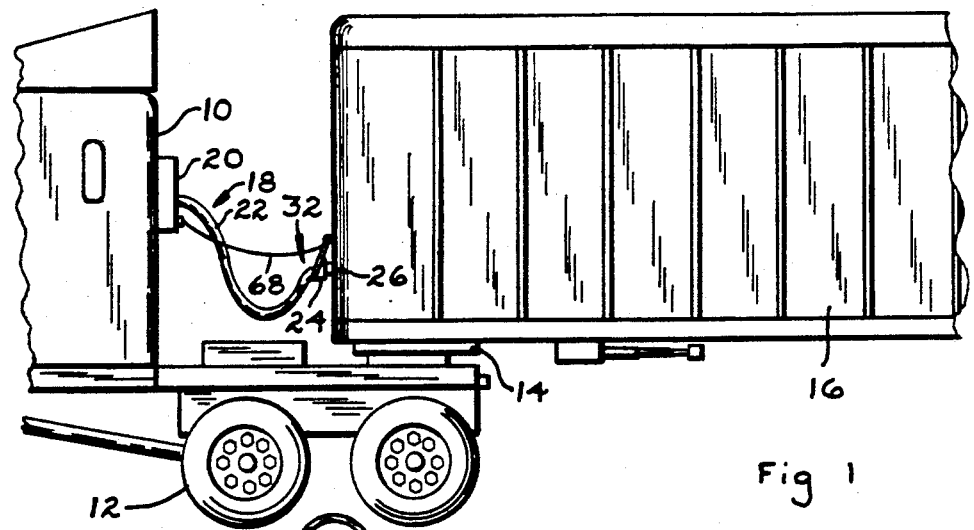
Fig 1
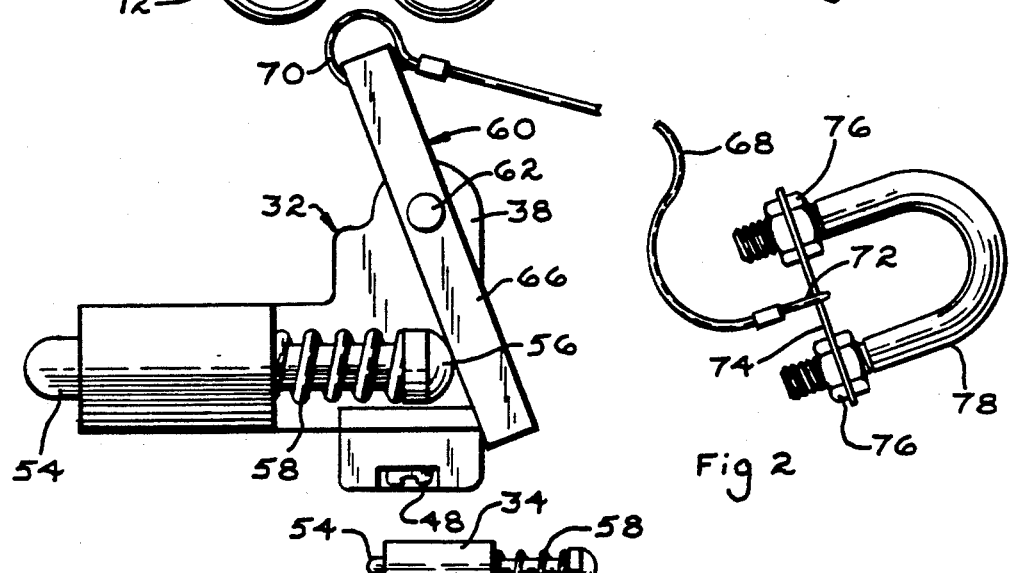
Fig 2
Fig 3
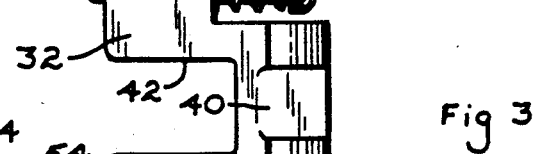
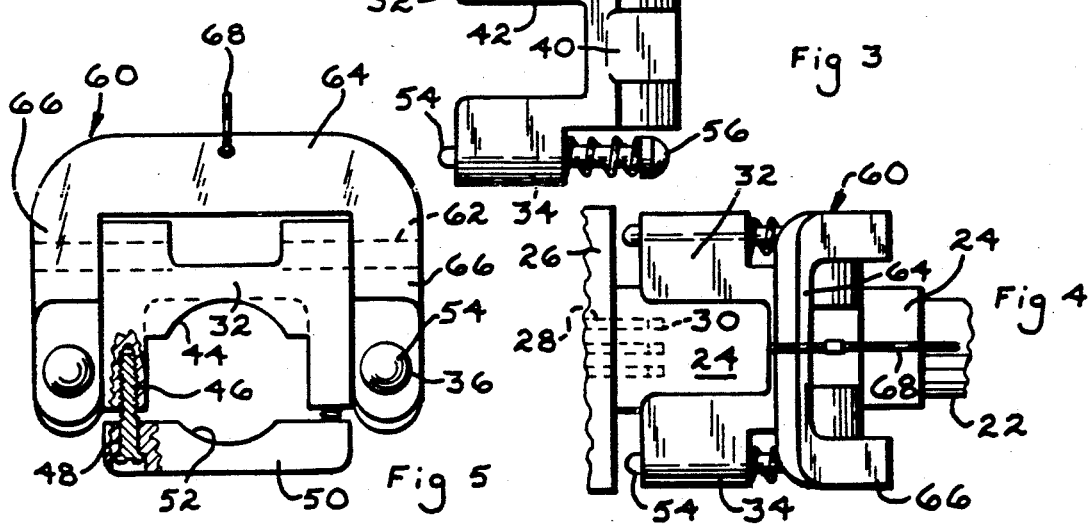
Fig 5     Fig 4

ELECTRICAL BREAKAWAY CONDUCTOR

BACKGROUND OF THE INVENTION

Vehicles pulling trailers such as tractors/semi-trailer units employ air hoses and electrical conductors between the tractor and trailer units whereby the tractor may control the trailer brakes and operate the trailer lights. The pressurized hose and electrical conductors between the tractor and trailer must be long enough to accommodate movement between the vehicles during turning so as not to unduly tension the hose and conductors, and these flexible components are of a length considerably greater than the distance separating the tractor and trailer attachment points wherein the flexible component will be in the form of a downwardly extending loop or bend.

The electrical connections between a conventional tractor and trailer are of the push-to-connect type wherein the fitting mounted upon the tractor supported flexible conductor includes linear terminals, usually of the female type adapted to cooperate with a receptacle fixed upon the front of the trailer having male terminals. A relative linear movement between the fitting and receptacle will interconnect the terminals, and this linear movement is generally parallel to the longitudinal length of the vehicles.

When disconnecting the trailer from the tractor the operator is instructed to manually withdraw the flexible conductor fitting from the receptacle prior to releasing the trailer. However, it is not uncommon for the driver to either forget to disconnect the electrical components, or purposely not do so relying upon the tension within the flexible electrical conductor to pull its fitting from the receptacle. While such tensioning of the electrical conductor will usually successfully disconnect the fitting and receptacle, occasionally, due to binding or other reasons, the flexible conductor fitting and receptacle do not disconnect as the conductor is tensioned as the truck moves away from the trailer and in such instances severe damage to the wiring harness can result requiring several thousands of dollars in repair costs.

It is an object of the invention to provide an automatic electrical breakaway actuator for use with vehicles or the like employing a flexible conductor wherein automatic disconnection of the electrical components occurs prior to significant tension forces occurring within the flexible conductor.

Another object of the invention is to provide an automatic electrical breakaway actuator for electrical systems utilizing a flexible conductor wherein the breakaway actuator can be retrofitted to existing tractor/trailer units and is economical to manufacture and install.

An additional object of the invention is to provide a foolproof automatic electrical breakaway for separating electrical components which include a flexible conductor upon a pre-determined tension being produced within a lanyard operating electrical component release mechanism, the lanyard being of a length less than that of the flexible conductor wherein tension forces within the lanyard occur prior to the conductor being tensioned and preventing damage to the conductor and associated wiring harness.

In the practice of the invention an actuator body is attached to the electrical fitting associated with the tractor mounted flexible conductor. This fitting is adapted to be inserted into a receptacle mounted upon the front end of the trailer, and the fitting and receptacle utilize cooperating male and female terminals having a length substantially parallel to the length of the associated vehicle wherein a linear push-to-connect relative motion between the fitting and receptacle connects and disconnects the electrical terminals.

The actuator body includes a pair of linearly moveable plungers located upon opposite sides of the flexible conductor fitting which, in an extended position, engage the receptacle and will disconnect the electrical fitting attached to the body from the receptacle. In their retracted position the plungers clear the receptacle permitting the fitting and receptacle to be manually interconnected in the normal manner.

The plungers are operated by a U-shaped lever mounted upon the actuator body, and one end of a flexible lanyard is attached to the lever, and the other lanyard end is affixed to the vehicle to which the flexible conductor is attached.

The length of the lanyard is less than the length of the flexible conductor whereby the lanyard will be tensioned prior to significant tension forces being applied to the conductor as the tractor and trailer separate. Tensioning of the lanyard pivots the lever to extend the plungers and disconnect the fitting from the receptacle prior to conductor tensioning. As the actuator body is located adjacent the receptacle the extension of the plungers in a direction parallel to the length of the terminals separates the fitting and receptacle in a non-binding manner releasing the fitting from the receptacle and preventing damage to the flexible conductor or the associated wiring harness. The actuator in accord with the invention automatically operates without attention by the tractor driver and the cost of the actuator is significantly less than the cost of repairing even a single damaged wire harness.

BRIEF DESCRIPTION OF THE DRAWINGS

The aforementioned objects and advantages of the invention will be appreciated from the following description and accompanying drawings wherein:

FIG. 1 is a partial, elevational, view of a tractor and semi-trailer in interconnected relationship illustrating the wiring harness and electrical conductor having an actuator mounted thereon in accord with the invention, FIG. 2 is an elevational view of the breakaway actuator apparatus, per se, FIG. 3 is a plan view of the actuator body, per se, prior to the mounting of the lever thereon, FIG. 4 is a plan view of the actuator body, fully assembled, and as mounted upon a flexible conductor fitting which has been received within the trailer receptacle, and FIG. 5 is an end view of the actuator body, partially broken, prior to mounting the body upon a conductor fitting.

DESCRIPTION OF THE PREFERRED EMBODIMENTS

In FIG. 1 a typical tractor and semi-trailer arrangement is illustrated, and in this environment the invention will find its greatest use. Of course, the invention can be used in any situation wherein two separable members connected by a flexible electrical or hose connector of the push-to-connect type are employed.

A conventional truck tractor 10 is driven through its drive wheels 12 and supports a fifth wheel 14 which cooperates with the king pin of a trailer 16 whereby the tractor 10 and the trailer 16 may be interconnected in the normal manner. As the lights and other electrical components of the trailer 16 are supplied from the electrical system of the tractor a conventional wiring harness 18 mounted upon the tractor is used to supply electrical power to the trailer. The wiring harness 18 includes the electrical outlet box 20 mounted upon the tractor and the flexible electrical conductor 22 is firmly attached to the box having a free end upon which the fitting 24 is mounted. The length of the conductor 22 is significantly greater than the distance separating the box 20 and the front wall of the trailer 16 wherein the conductor 22 will be in the form of a loop when the fitting 24 is connected to the trailer receptacle 26 mounted upon the trailer front wall. Of course, the conductor 22 must be of sufficient length to prevent the conductor from being tensioned as the connected vehicles turn and are otherwise maneuvered.

The receptacle 26 is permanently affixed to the trailer front wall, as is the usual installation, and the receptacle 26 includes terminal pins 28 as represented in dotted lines in FIG. 4. In a complimentary manner, female terminals 30 are defined in the fitting 24 which match with the terminals 28 whereby electrical connection between the terminals occurs upon the fitting 24 being plugged into the receptacle 26. The length of the terminals 28 and 30 is substantially parallel to the length of the tractor 10 and the trailer 16, and as the terminals are of a linear configuration interconnection thereof is accomplished by a simple push-to-connect linear motion plugging the fitting 24 into the receptacle 26.

The aforedescribed apparatus is of a conventional type widely used on tractor and trailer equipment, and does not constitute a novel contribution to the art.

The invention pertains to an actuator which is mounted upon the fitting 24 for automatically releasing the fitting 24 from the receptacle 26, and the actuator includes the actuator body 32 which is mounted upon the fitting 24.

The actuator body 32 includes a pair of wings 34 mounted upon opposite sides of the longitudinal axis of the body and each of the wings is provided with a cylindrical plunger receiving hole 36 parallel to the body axis. An extension 38 extends upwardly, and the central region of the body is defined at 40, and the central region may be cut out at 42 intermediate the wings 34.

A concave semi-cylindrical cradle 44 is defined on the underside of the body central region 40 as viewed in FIG. 3. The cradle surface 44 is shown in FIG. 5, and is of a configuration complimentary to the generally cylindrical configuration of the conductor fitting 24 whereby the conductor fitting will be closely received within the cradle.

The central region 40, on its underside, is provided with a pair of threaded holes 46 for receiving screws 48, and the screws 48 extend through a bridge 50 which is disposed in opposed relationship to the cradle surface 44. The bridge 50 includes a concave bridge surface 52 of a semi-cylindrical configuration corresponding to that of cradle surface 44 wherein the actuator body 32 may be firmly clamped upon the fitting 24 at surfaces 44 and 52 by tightening of the screws 48.

Linearly moveable plungers 54 are mounted within the actuator body holes 36 and the plungers 54 each include an enlarged head 56 and a spring 58 encircling each of the plungers is imposed between a body wing 34 and a plunger head biasing the plungers to the right, FIGS. 2-4, toward the plunger retracted position.

The operation of the plungers 54 is controlled by the lever 60 pivotally mounted upon the actuator body 32 by the body pivot 62. The lever 60 is of a U configuration including a base 64 from which the parallel legs 66 extend. The inner ends of the legs 66 are in alignment with the heads 56 of the plungers 54 and as the heads are of a rounded convex configuration the lever legs 66 engage the plunger heads for linearly displacing the plunger as the lever 60 pivots upon pivot 62.

The lever base 64 constitutes the outer end of the lever structure, and the flexible lanyard 68 is mounted to the center of the base 64. The lanyard 68 may be formed of wire cable, and includes a loop 70 at one end passing through a hole in the lever base, and the lanyard loop 72 at the other end passes through a hole defined in a bracket 74 having holes so as to be received upon the legs of the U-bolt 78. Nuts 76 threaded upon the U-bolt 78 firmly affix the bracket 74 to the U-bolt and the U-bolt associated structure constitutes the anchor for the lanyard.

In use, the U-bolt 78 is attached to fixed structure upon the tractor 10, such as the electrical box 20. The actuator body 32 is mounted upon the conductor fitting 24 by locating the fitting 24 between the cradle surface 44 and the bridge surface 52 and tightening the screws 48. The length of the lanyard 68 permits the fitting 24 to be readily plugged into the receptacle 26, and in normal use the length of the lanyard 68 is long enough so that the lanyard will hang down in a loop as illustrated in FIG. 1 so that as the tractor and trailer are maneuvered and turned the lanyard will not be tensioned. However, the length of the lanyard 68 is less than the length of the conductor 22.

When it is desired to disconnect the fitting 24 from the receptacle 26, preferably, the operator will manually pull on the lanyard 68, or operate the lever 60 by hand, so as to pivot the lever 60 in a clockwise direction, FIG. 2, causing the lower end of the legs 66 to bear against the plunger heads 56 linearly displacing the plungers to the left compressing the springs 58. The movement of the plungers 54 to the left causes the plungers to extend from the associated wings 34 and engage the receptacle 26. This movement of the plungers to engage the receptacle produces a linear displacement between the fitting and the receptacle unplugging the fitting terminals therefrom and breaking the electrical and mechanical connections between the fitting and receptacle. If, the driver neglects to manually disconnect the fitting 24 from the receptacle 26, or prefers to make the disconnection automatically, after the fifth wheel 14 is released from the trailer 16 the operator will drive the tractor 10 forwardly and as the tractor and trailer separate the lanyard 68 will become tensioned prior to significant tension occurring in the conductor 22 due to the greater length of the conductor as compared to the lanyard. Tensioning of the lanyard 22 causes the lever 60 to pivot in the clockwise direction, FIG. 2, linearly displacing the plungers from the retracted to the extended positions disconnecting the fitting 24 and receptacle 26 as described above. As the actuator body 32 is directly mounted upon the fitting 24 adjacent the receptacle and as the plungers 54 are parallel to the length of the terminals 28 and 30 binding of the terminals is eliminated and an automatic disconnection of the fitting and receptacle occurs without damage to the wiring harness.

The compression springs 58 are relatively stiff to prevent vibration forces imposed upon the lever 60 from inadvertently disconnecting the fitting and receptacle, and stop means, not shown, are incorporated into the plungers 54, or limit the lever movement 60, so as to maintain the plungers within the actuator body holes 36.

As the actuator body 32 may be readily mounted upon existing fittings 24 retrofitting the invention to older wiring harnesses is readily accomplished, and the ease of use of the U-bolt 78 adds to the quick assembly of the invention to existing equipment.

It is appreciated that various modifications of the inventive concepts may be apparent to those skilled in the art without departing from the spirit and scope of the invention.

We claim:

1. In an electrical breakaway connector for electrical conductor systems between a pair of selectively interconnectable vehicles having a flexible conductor member attached to one vehicle and an electrical receptacle member mounted on the other vehicle, one of said members having elongated male terminals and the other member having elongated female terminals connectively receiving the one member male terminals upon non-rotative linear movement of said members toward each other to establish an electrical connection therebetween, the improvement comprising, an actuator body mounted on the flexible conductor member adjacent to the receptacle member, actuator means mounted upon said body movable between a first position non-interfering with the interconnected members and a second separation-inducing position, and a flexible lanyard having a first end connected to said actuator means and a second end connectable to the one vehicle, the length of the flexible conductor member being greater than the length of said lanyard whereby attachment of said lanyard second end to the one vehicle causes said lanyard to be tensioned to displace said actuator from said actuator first position to said second position disconnecting the members upon the vehicle separating prior to significant tension being applied to the conductor member, said actuator body including a fitting having terminals defined within the fitting and in electrical connection with the receptacle terminals, fitting receiving means defined on said actuator body, said receiving means including holding means for holding the fitting within said fitting receiving means and comprising a concave cradle defined on said actuator body, said holding means comprising a bridge extending over said cradle, and threaded fasteners releasably mounting said bridge upon said body.

2. In an electrical breakaway connector actuator as in claim 1, said actuator including at least one linearly movable plunger displaceably mounted on said body movable in the direction substantially parallel to the length of the terminals, said plunger being movable between a retracted position clearing the receptacle member and an extended position engaging the receptacle member and an operator movably mounted on said body operatively connected to said plunger and said lanyard extending said plunger into engagement with the receptacle member to disconnect the members upon tensioning of said lanyard.

3. In an electrical breakaway connector actuator as in claim 2, spring means interposed between said plunger and said body biasing said plunger toward said retracted position.

4. In an electrical breakaway connector actuator as in claim 2, said operator including a pivot mounted upon said body, a lever mounted upon said pivot having inner and outer ends, said lanyard being connected to said lever outer end and said inner end engaging said plunger.

5. In an electrical breakaway connector actuator as in claim 4, two linearly movable plungers mounted on said body, said lever being of a U configuration having a pair of legs interconnected by a base, each of said legs adapted to selectively engage a plunger, said lanyard being connected to said base.

6. An electrical breakaway connector actuator for electrical conductor systems for a pair of selectively interconnectable vehicles having a flexible member attached to one vehicle and an electrical receptacle member mounted on the other vehicle, one of said members having elongated male terminals and the other member having elongated female terminals connectively receiving the one member male terminals upon non-rotative linear movement of said members toward each other to establish an electrical connection between the members, the flexible conductor member including an end having a fitting, terminals defined in the fitting for selective electrical connection with the receptacle terminals, the improvement comprising, an actuator body, a cradle defined on said actuator body for receiving the conductor fitting, a clamp mounted on said body adjacent said cradle for clamping the conductor fitting in said cradle, a pair of linearly movable plungers displaceably mounted on said body movable in the direction substantially parallel to the length of the members, terminals, said plungers each being movable between a retracted position clearing the receptacle, and an extended position engaging the receptacle member, said plungers being located on opposite sides of said cradle, lever means pivotally mounted upon said body operatively associated with said plungers for displacing said plungers from said retracted position to said extended position, and a flexible lanyard connected to said lever means and the one vehicle having a length less than the length of the flexible conductor whereby tensioning of said lanyard pivots said lever means to extend said plungers to engage the receptacle and disconnect a fitting within said cradle from the receptacle.

7. In an electrical breakaway connector actuator as in claim 6, spring means interposed between said plungers and said body biasing said plungers toward said retracted position 8. In an electrical breakaway connector actuator as in claim 6, said lever being of a U configuration having a pair of legs interconnected by a base, each of said legs adapted to selectively engage a plunger, said lanyard being connected to said base.

* * * * *